June 10, 1941.  G. A. TINNERMAN  2,244,976
FASTENING DEVICE
Filed June 8, 1939  2 Sheets-Sheet 1

INVENTOR.
GEORGE A. TINNERMAN
BY Bates, Goldrick & Teare
ATTORNEYS

June 10, 1941.   G. A. TINNERMAN   2,244,976
FASTENING DEVICE
Filed June 8, 1939   2 Sheets-Sheet 2

INVENTOR.
GEORGE A. TINNERMAN
BY  Bates, Golrick, & Teare
ATTORNEYS

Patented June 10, 1941

2,244,976

UNITED STATES PATENT OFFICE 2,244,976

FASTENING DEVICE

George A. Tinnerman, Rocky River, Ohio, assignor, by mesne assignments, to Tinnerman Products, Inc., Cleveland, Ohio, a corporation of Ohio Application June 8, 1939, Serial No. 278,053

11 Claims. (Cl. 85—32)

This invention relates to fastening devices, and particularly to those that are made of sheet metal, cold rolled metal, and the like.

The device of the present application is particularly useful for receiving a threaded member by means of which articles may be fastened together. More particularly, the invention is adapted for enabling articles to be fastened to relatively thin panels of sheet metal or other material which normally possesses insufficient thickness to be threaded for the reception of a bolt, screw or the like. Additionally, the invention is applicable for enabling a threaded member to be used as a fastener in locations where access to the panel may be had only from one side thereof.

An object of the invention is to provide a fastening device which may be positioned upon one article inserting it through an opening therein, and which when so positioned will be automatically locked against rotation with reference thereto, and against inadvertent displacement in an axial direction, whereby subsequently a threaded member that is passed through an article may be inserted into the device and tightened in an expeditious manner.

A further object of the invention is to provide a combination of article and fastening device, wherein the article has an irregularly shaped opening for receiving the device, and wherein the device has a complementary-shaped part that coacts with the walls of the opening to effect an automatic locking action therewith upon insertion thereof through the opening.

A further object is to provide a fastening device in the form of a split hollow tube wherein provision is made for slight expansive action, to accommodate a fastening device that is inserted therethrough, yet to limit the degree of expansibility thereby assuring a joint of predetermined rigidity between the device and the article that is inserted therethrough.

Figure 1:
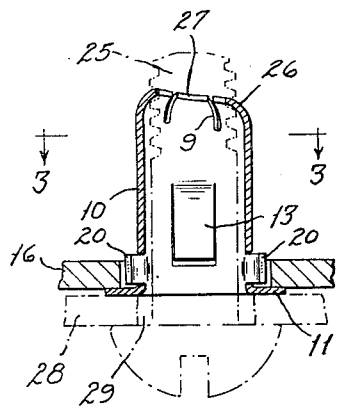
Figures 2, 3:
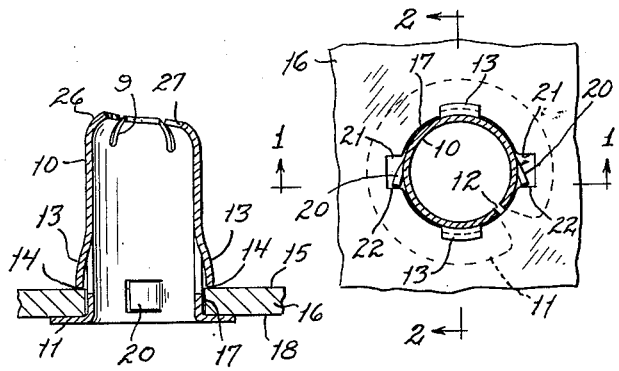
Figure 5:
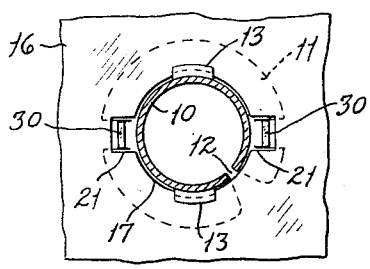
Figure 13:
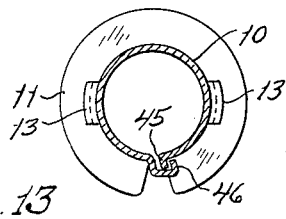
Figure 14:
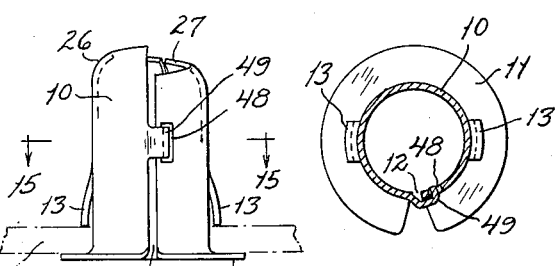
Figure 15:
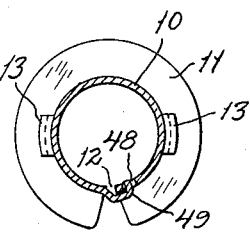

Referring now to the drawings, Figs. 1 and 2 are sections taken through a fastening device and support on the corresponding lines in Fig. 3; Fig. 3 is a section taken on the line 3—3 in Fig. 1; Figs. 4, 6, 8 and 10 are longitudinal sections taken through a modified form of fastener construction; Figs. 5, 7, 9 and 11 are horizontal sections taken on correspondingly numbered lines of Figs. 4, 6, 8 and 10 respectively; Figs. 12 and 14 are side views of fasteners embodying further modified forms and Figs. 13 and 15 are horizontal sections taken on the correspondingly numbered lines in Figs. 12 and 14 respectively.

The fastening devices as illustrated are preferably formed from a substantially rectangular section of sheet metal or strip stock of the desired width. The blank is suitably slit and deformed to make the desired yielding and locking formations, and is also shaped to form a hollow body which may have a longitudinally extending slit that permits a slight expansion to accommodate an article that is inserted therethrough. The degree of pressure that is intended to be exerted between the article and fastener may be varied by proportioning the cross-sectional area of the hollow body to that of the threaded fastener or other member to be inserted therein, it being understood that a tighter fit is chosen for those instances where relatively greater frictional contact is desired between the cooperating parts.

Referring first to the fastener illustrated in Figs. 1 to 3 inclusive, the blank is deformed to provide a hollow body 10 which has a flange 11 at one end thereof, and which is illustrated in the form of a slitted tube wherein the slit is indicated at 12 as extending the full length of the tube. The body is shown as having yieldable fingers 13 that are deformed therefrom to provide shoulders 14, which as shown in Fig. 2, are adapted to engage the face 15 of the article 16 which is shown in the form of a panel, and which has an opening 17 through which the body of the fastener may be passed. The flange 11 engages the face 18 of the panel 16 and the space between the shoulders 14 and the flange 11 is so chosen that the panel makes a snug fit therebetween so as to avoid as much as possible any loose play in an axial direction of the body. The engagement is adequate to lock the body in position whenever it is passed through the opening 17 from the side of the face 18.

To lock the body against rotation there is illustrated in Figs. 1 and 3, additional prongs or fingers 20 which are deformed from the body in spaced relationship to the fingers 13 and preferably in the region of the body intermediate the fingers 13 and the flange 11. The fingers 20 are adapted to enter slots 21 as shown in Fig. 3, and to engage the walls 22 thereof whenever the fastener is locked into position as shown in Fig. 2. I prefer to extend the fingers 20 in opposite directions from the body so as to prevent rotation in either direction. For example, one of the fingers 20 as shown at the right-hand side of Fig. 3 extends in a clock-wise direction from the body, while that on the left-hand side extends in a counter-clockwise direction from the body.

The fastener illustrated in Figs. 1 to 3 inclusive is intended for use with a threaded member such as a screw or bolt, or the like as indicated for example at 25, in Fig. 1, and for this purpose the end of the body opposite the flange 11 is cupped inwardly as at 26 and the marginal portions 27 are shaped on a helix in conformity with the shape of the helix on the thread of the bolt with which the fastener is intended to be used. The cupping of the metal, as at 26, may be facilitated if the body is slit a short distance inwardly from the end, as indicated at 9.

The diameter of the opening 17 is just sufficient to allow the fastener to be moved in an endwise direction therethrough and during such movement the fingers 13 are automatically pressed inwardly until the shoulders 14 clear the face 15 at which time the fingers spring inwardly and thereby prevent retraction of the fastener. During the inserting operation it is to be understood that the fingers 20 are in registration with the slots 21 which lead from the opening 17 on opposite sides thereof. Accordingly the fastener is automatically locked against axial movement and also against rotation merely by inserting it in an endwise direction through the opening in the panel. At the completion of the inserting operation, the article 28 having a bolt receiving opening 29 therein, in registration with the opening 17, is pressed against the flange 11 and the threaded fastener 25 is inserted therethrough. It is to be understood that the walls of the opening 29 clear the shank of the bolt, wherefore tightening of the bolt against the threaded engaging portion 26 effectively locks the parts 16 and 28 together.

Modified forms of my invention are shown in Figs. 4, 6, 8 and 10; these forms differing from that shown in Fig. 1 chiefly in the means which provide a locking action between the body and the panel. Thus in Figs. 4 and 5, the fastener has tongues 30 which are struck from the flange 11 for engagement with the walls of slots 21 that extend from the opening 17 in the same manner as the slots heretofore illustrated and described in connection with Fig. 3. In this form of fastener, the body has other parts that correspond to that shown in Fig. 1, and hence the similar portions are identified with the same reference characters.

Figure 7:
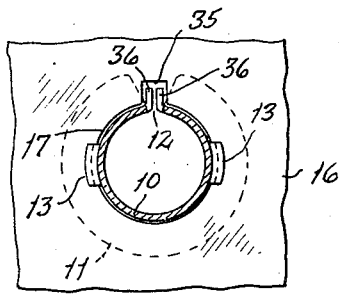
Figure 4:
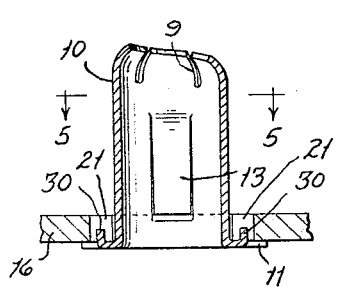
Figure 6:
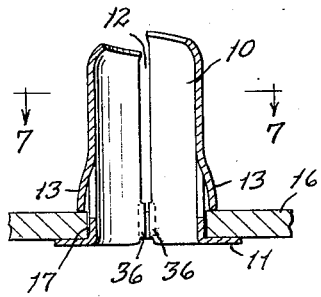

In Fig. 6 the locking action between the fastener and support takes the form of a single slot 35 which leads from the opening 17 and coacting tongues 36 which are formed from the body adjacent the edges of the slit 12. This form requires only one slot in the support, and a simple operation for making the coacting tongues as shown in Fig. 7. Clearance is provided between the tongues and the wall of the slot to allow a slight expanding operation of the body.

Figure 9:
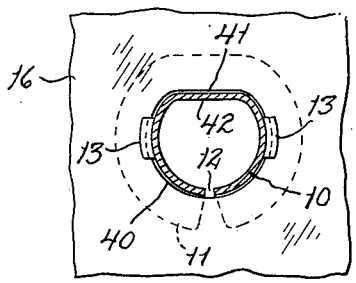
Figure 8:
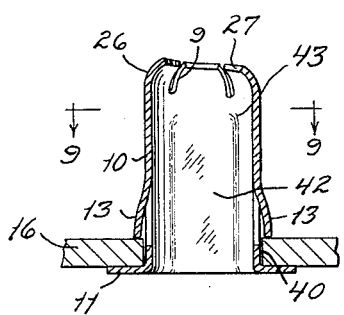

The illustration in Fig. 8 shows a fastener wherein a locking action is obtained by having an irregularly shaped opening 40 in the support and by having a complementarily shaped body at least in that portion that is adapted to contact the support at the completion of the assembly operation. In Figs. 8 and 9 the opening is D-shaped wherein the flat portion is indicated at 41, and the complementarily shaped portion of the body is indicated at 42. As shown in Fig. 8, the flat portion terminates adjacent the point 43 which is approximately at the base of the cupped portion 26 so as to not interfere with the working fit between the thread engaging portion 27 and the thread on the fastener.

Figure 11:
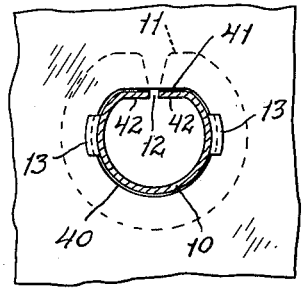
Figure 10:
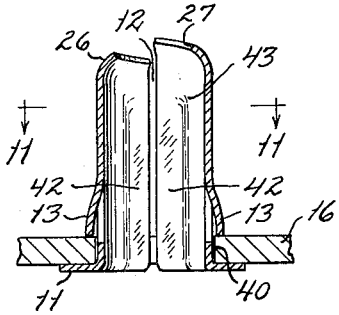
Figure 12:
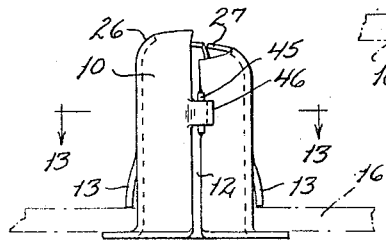

In the modification of Figs. 10 and 11, the locking action between the fastener body and the panel is also obtained by means of an irregularly shaped opening in the support, and a complementarily shaped portion in the fastener body and in this arrangement, the opening is D-shaped but the flat portion on the body is adjacent the slit 12 instead of on the portion midway between the edges of the slit 12 as is the case in Fig. 9. In all other respects the fastener of Fig. 10 as well as that of Fig. 8 has locking fingers 13 and a flange 11 as described in connection with the fastener of Fig. 1.

The form illustrated in Figs. 12 and 14 is intended to provide an arrangement for limiting the expansion of the body and for this purpose as shown in Figs. 12 and 13, coacting locking shoulders 45 and 46 are formed on the body adjacent the shoulder 45 in the form of an ear that extends outwardly from one wall of the slit while the shoulder 46 is in the form of a finger that extends over the ear and is crimped behind the same. As shown there is a slight clearance between the ear and finger so as to allow an expansive action in a predetermined amount, and yet to limit the expansive action to the degree desired. This fastener may also be provided with means for preventing rotation as shown in any one of the preceding types of fasteners and in the coacting supports therefor.

Figs. 14 and 15 illustrate a further modification of a means which may be utilized for limiting the expansive characteristic of the body and in these illustrations the limiting device takes the form of a slot 48 in the body and a coacting tongue 49 which extends from one wall of the slit 12 and is shaped to enter the slot as shown in Fig. 15. In such illustration clearance is provided between the tongue and the walls of the slot to permit expansibility in the desired degree. This fastener like that of Fig. 12 may also be provided with any arrangement for preventing rotation with reference to the support as illustrated in the preceding types of fasteners.

From the foregoing description it will be apparent that I have provided a simple sheet metal fastening device that may be inserted into an opening in a thin walled support and may operate automatically to lock itself against movement in any direction with reference to the support whereby it is located in position for receiving a threaded member that is introduced into the fastener from the same side of the support from which the fastener is inserted.

I claim:

1. A fastening device comprising a hollow sheet metal body having an outwardly extending flange adjacent one edge thereof and having at least one flexible finger extending longitudinally thereof and spaced from the flange, the edge of the finger being spaced from the flange a distance sufficient to receive a support having a shoulder thereon, and said body having another finger deformed therefrom for engaging the shoulder and for preventing rotation thereof with reference to the support.

2. The combination of a support having an opening and having a slot communicating with the opening, a fastener comprising a hollow body extending through the support, and having a member extending outwardly therefrom adjacent one end thereof and entering said slot whereby rotation of the fastener is prevented in at least one direction with reference to the support, and having a portion thereof adjacent the other end, deformed inwardly and shaped helically to engage a threaded member.

3. The combination of a support having an opening therein and having spaced slots communicating with the opening, a fastener comprising a hollow body having means thereon adjacent one end thereof for engaging opposite sides of the support and having other means thereon adjacent the same end and extending into the slots in the support, whereby the fastener is locked against movement axially and rotatively with reference to the support.

4. A fastening device comprising a hollow body having a flange adjacent one edge thereof and having a tongue deformed from the flange and extending in the same general direction as the body, said tongue being adapted to enter an opening in the support for locking the fastener against rotation with reference to the support, said body having a thread-engaging portion formed in the end thereof opposite said flange.

5. The combination of a support having an opening therein and having a slot communicating with the opening, a fastener comprising a hollow body having a slit extending longitudinally thereof and having tongues formed therefrom adjacent the walls of the slit for entering the slot and limiting rotation thereof with reference to the support, said body having a thread-engaging portion formed in the end thereof opposite said flange.

6. A fastener comprising a hollow sheet metal body having one end thereof cupped inwardly and shaped in the form of a helix to engage a threaded member and having fingers and a flange deformed therein at spaced intervals thereon for engaging a support and locking it against movement in an axial direction with reference to the support, and having other fingers deformed therefrom for engaging the support, and locking the body against rotative movement with reference to the support.

7. A fastening device comprising a hollow sheet metal body adapted for the reception of a bolt or the like, and having fingers deformed therefrom for engaging the wall of an opening in the support through which a fastener is passed for locking the fastener against rotation with reference to the support, and having yieldable fingers disposed intermediate the ends thereof, and a flange positioned at the end thereof, the yieldable fingers and flange cooperating to engage opposite sides of said support for locking the fastener against longitudinal movement with reference to the support.

8. A fastening device comprising a hollow sheet metal body adapted to be passed through an opening in a support, and having means deformed therefrom and providing spaced shoulders for engaging opposite faces of the support to prevent axial movement thereof with reference to the support, and having a lug deformed therefrom and disposed intermediate the planes of said shoulders for engaging a wall of the opening in the support to prevent rotative movement thereof with reference to the support.

9. A fastening device comprising a hollow sheet metal body having one end thereof bent inwardly and shaped to a helix having a pitch of a screw with which the fastening device is intended to be used, and having portions deformed therefrom adjacent the end opposite the thread engaging portion, said portions providing shoulders for engaging opposite sides of a support to hold the fastener in position to receive a threaded member and providing other shoulders for engaging a shoulder on the support intermediate the plane of said sides of the support.

10. A fastening device comprising a hollow sheet metal body having a generally cylindrical shape and having a slit extending longitudinally thereof for permitting expansibility during the insertion of an article therethrough, said body having a finger struck outwardly therefrom for engaging one side of a support and having a flange adjacent one end thereof for engaging the opposite side of said support and cooperating with said finger to prevent movement of the fastener in a longitudinal direction with reference to the support, said support having a slot communicating with an opening therein for the insertion of said body, and said body having a finger adapted to engage said slot for preventing rotation of the fastener with reference to the support.

11. A fastening device comprising a hollow sheet metal body of generally cylindrical shape having an outwardly extending flange at one end thereof and having an inwardly turned periphery at the other end thereof, the inwardly turned portion being shaped to conform to the helix of a threaded member that is adapted to be passed through the device for locking engagement therewith, and said body having a slit extending longitudinally thereof and having interlocking means for limiting expansive movement of the walls of the body sufficient to maintain a threaded engagement between the fastener and said threaded member, and said body having other means cooperating with the flange for engaging the support and locking it against rotation with respect thereto.

GEORGE A. TINNERMAN.